(12) United States Patent
Zhao

(10) Patent No.: US 12,203,586 B2
(45) Date of Patent: Jan. 21, 2025

(54) GRAPHENE-HEATING AND HEAT-PRESERVING SLEEVE FOR AN OILFIELD PETROLEUM GATHERING PIPELINE

(71) Applicant: Anping Zhao, Beijing (CN)

(72) Inventor: Anping Zhao, Beijing (CN)

( * ) Notice: Subject to any disclaimer, the term of this patent is extended or adjusted under 35 U.S.C. 154(b) by 446 days.

(21) Appl. No.: 17/442,274

(22) PCT Filed: Jul. 10, 2019

(86) PCT No.: PCT/CN2019/000142
§ 371 (c)(1),
(2) Date: Sep. 23, 2021

(87) PCT Pub. No.: WO2020/198898
PCT Pub. Date: Oct. 8, 2020

(65) Prior Publication Data
US 2022/0057042 A1 Feb. 24, 2022

(30) Foreign Application Priority Data
Apr. 3, 2019 (CN) .......................... 201910263602.9

(51) Int. Cl.
*F16L 59/02* (2006.01)
*F16L 53/30* (2018.01)

(52) U.S. Cl.
CPC ............. *F16L 59/029* (2013.01); *F16L 53/30* (2018.01)

(58) Field of Classification Search
CPC ......... F16L 53/30; F16L 53/34; F16L 59/024; F16L 59/029; H05B 2214/04; H05B 3/145; H05B 2214/03; H05B 3/141; H05B 6/62; H05B 3/42; H05B 3/03; H05B 6/54; H05B 3/48; H05B 3/04; H05B 3/44
See application file for complete search history.

(56) References Cited

U.S. PATENT DOCUMENTS 5,964,252 A * 10/1999 Simmons .............. F16L 59/022
428/40.1

FOREIGN PATENT DOCUMENTS

| CN | 205534838 U | 8/2016 |
|----|-------------|--------|
| CN | 109005607 A | 12/2018 |
| CN | 208479963 U | 2/2019 |
| CN | 109882683 A | 6/2019 |
| WO | 2014112953 A1 | 7/2014 |

* cited by examiner

*Primary Examiner* — Yan Lan
(74) *Attorney, Agent, or Firm* — Russell D. Nugent; The Humphries Law Firm, P.C.

(57) ABSTRACT

A graphene-heating and heat preserving sleeve for a oilfield petroleum gathering pipeline includes a the high-temperature-resistant insulating layer (1), a graphene layer (2), a high-temperature-resistant ceramic layer (4), a waterproof and anti-static heat preservation layer (5), and a housing (6) that are tightly attached together in sequence; the two semi-cylindrical parts of the graphene-heating and heat-preserving sleeve are coupled together, so that the petroleum gathering pipeline is wrapped in the graphene-heating and heat-preserving sleeve. When electricity is applied to the electrode layers arranged at two ends of the graphene layer (2), under the action of an electric field, heat energy generated due to intense friction and collision between carbon atoms in the graphene is radiated out through far infrared rays with a wavelength of 5 to 14 microns.

1 Claim, 3 Drawing Sheets

GRAPHENE-HEATING AND HEAT-PRESERVING SLEEVE FOR AN OILFIELD PETROLEUM GATHERING PIPELINE

CROSS REFERENCE TO RELATED APPLICATIONS

This patent application is a national stage application of International Patent Application No. PCT/CN2019/000142, filed on Jul. 10, 2019, which claims the priority of Chinese Patent Application No. 201910263602.9 filed on Apr. 3, 2019, both of which are incorporated by reference herein in their entirety as part of the present application.

BACKGROUND OF THE INVENTION

Field of Invention

The present disclosure relates to a heating and heat-preserving device for an oilfield petroleum gathering pipeline, and in particular, to a graphene-heating and heat-preserving sleeve for an oilfield petroleum gathering pipeline, which reduces energy consumption, facilitates assembling and disassembling, and can effectively heat an oilfield petroleum gathering pipeline to prevent freezing.

Background Art

At present, a well-known method for preventing the freezing of oilfield petroleum gathering pipelines is to use high-frequency heating equipment to heat the oilfield petroleum gathering pipelines. The high-frequency heating, i.e., induction heating, is a method for heating an electric conductor by using electromagnetic induction, which will produce eddy current in a metal to cause Joule heating of the metal due to resistance. The high-frequency heating is performed by using a resistance heating principle, so the heating efficiency is low and waste of energy is very high, thereby producing very high production cost.

After checking relevant information at home and abroad, it is found that most of relevant heating equipment and technologies for preventing the oilfield petroleum gathering pipeline from freezing use the resistance heating principle for heating, such as the high-frequency heating equipment being used on a large scale, which results in an amazing waste of energy. In addition, a small number of heating methods using fossil fuel combustion to provide heat energy for heating also cause the waste of energy because of complex solutions and low heating efficiency.

BRIEF SUMMARY OF THE INVENTION

In order to overcome the disadvantages of serious waste of energy and the like caused by low heating efficiency of heating equipment using a resistance heating principle when an oilfield petroleum gathering pipeline freezes, the present disclosure provides a heating and heat-preserving sleeve for an oilfield petroleum gathering pipeline, with graphene as a heating source, which solves the problem of freezing of the oilfield petroleum gathering pipeline by using a principle that the graphene produces far infrared radiation under the action of an electric field.

The technical solution of the present disclosure is to provide a graphene-heating and heat preserving sleeve for a oilfield petroleum gathering pipeline, including a high-temperature-resistant insulating layer close to an outer wall of the oilfield petroleum gathering pipeline, a graphene layer and electrode layers, a high-temperature-resistant ceramic layer, a waterproof and anti-static heat preservation layer, and a housing that are tightly attached together in sequence. The graphene-heating and heat-preserving sleeve includes two semi-cylindrical parts; the two semi-cylindrical parts of the graphene-heating and heat-preserving sleeve are coupled together, so that the petroleum gathering pipeline is wrapped in the graphene-heating and heat-preserving sleeve. When electricity is applied to the electrode layers arranged at two ends of the graphene layer, under the action of an electric field, heat energy generated due to intense friction and collision between carbon atoms in the graphene is radiated out in a plane manner through far infrared rays with a wavelength of 5 to 14 microns, which can provide heat in a balanced manner and can control a temperature by using a temperature controller. The total conversion rate of effective electric heat energy reaches over 99%, the requirements of heating and heat preservation of the oilfield petroleum gathering pipeline are effectively met, and the effect of reducing energy consumption is achieved.

Some embodiment have the following advantages that: a heating manner using a non-resistance heating principle is adopted, which effectively meets the requirements of heating and heat preservation of the oilfield petroleum gathering pipeline, reduces the energy consumption, facilitates assembling and disassembling, and reduces the maintenance cost.

Reference sings in drawings: 1 high-temperature-resistant insulating layer, 2 graphene layer, 3 electrode layer, 4 high-temperature-resistant ceramic layer, 5 waterproof and anti-static heat preservation layer, 6 housing, 7 sealing cover, 8 hasp, 9 sealing clamping groove, 10 oilfield petroleum gathering pipeline, 11 wire, 12 explosion-proof connector, 13 explosion-proof temperature controller, 14 temperature sensing probe and 15 power supply.

DETAILED DESCRIPTION OF THE INVENTION

The present disclosure is described in detail in combination with the accompanying drawings and embodiments of the present disclosure.

EMBODIMENTS

Figure 2:
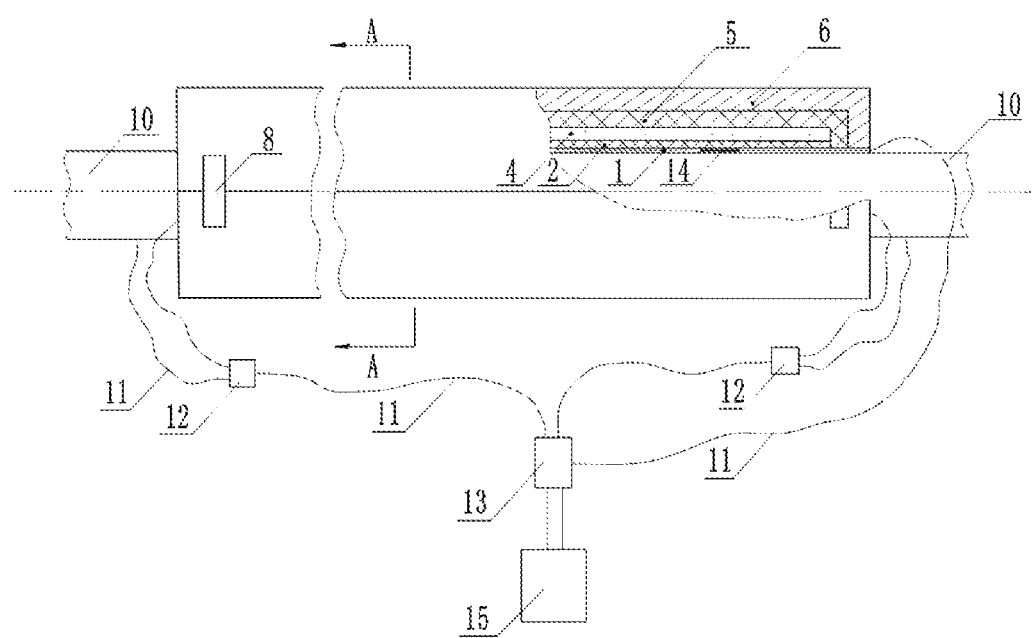
FIG. 2 is a schematic diagram of relative positions of materials for forming a graphene-heating and heat-preserving sleeve for an oilfield petroleum gathering pipeline according to the embodiment of the present disclosure.

As shown in FIG. 2, the two semi-cylindrical parts forming a graphene-heating and heat-preserving sleeve for an oilfield petroleum gathering pipeline are coupled together. Wires (11) led out from electrode layers (3), which are arranged at two ends of a graphene layer (2), are connected to an explosion-proof temperature controller (13). A wire (11) led out from the explosion-proof temperature controller is connected to a power supply (15). A temperature sensing probe (14) connected with the explosion-proof temperature controller is inserted into the graphene-heating and heat-preserving sleeve and is tightly attached to the outer surface of the oilfield petroleum gathering pipeline (10).

Figure 3:
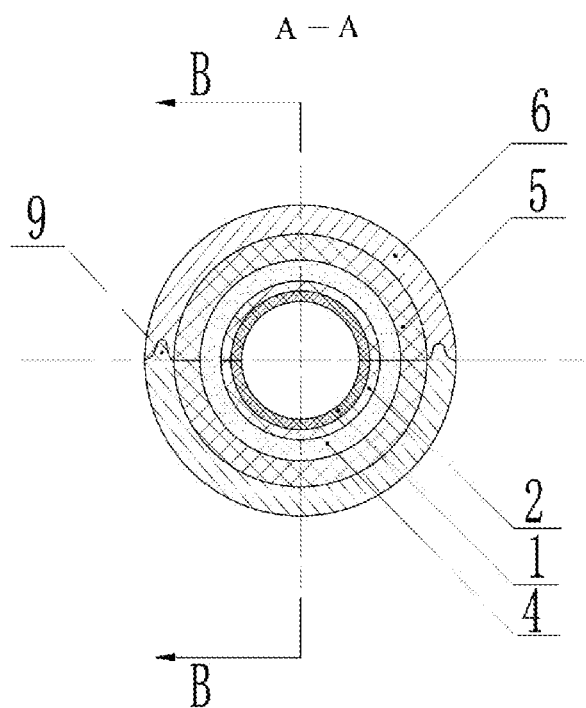
FIG. 3 is a schematic diagram of a sealing clamping groove of an embodiment of the present disclosure, where the oilfield petroleum gathering pipeline (10) and a hasp (8) are omitted from an A-directional view.

As shown in FIG. 2 and FIG. 3, a high-temperature-resistant insulating layer (1), the graphene layer (2), electrode layers (3), a high-temperature-resistant ceramic layer (4), a waterproof and anti-static heat preservation layer (5), and a housing (6) which form the graphene-heating and heat-preserving sleeve for the oilfield petroleum gathering pipeline, are attached together in sequence from inside to outside.

Figure 4:
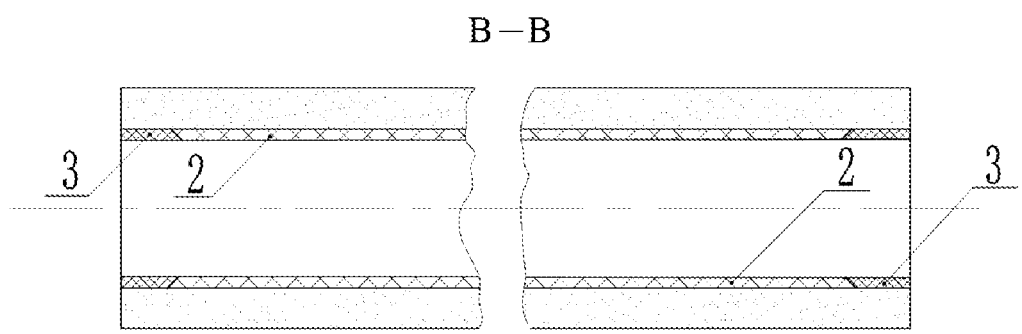
FIG. 4 is a schematic diagram of relative positions of a graphene layer and electrode layers in the embodiment of the present disclosure, where a housing (6), a waterproof and anti-static heat preservation layer (5), a sealing cover (7), and the oilfield petroleum gathering pipeline (10) are omitted from an B-directional view.

As shown in FIG. 4, the graphene layer (2) is tightly attached to the high-temperature-resistant ceramic layer (4). For the electrode layers (3) at the two ends of the graphene layer (2), a part of each electrode layer tightly presses the graphene layer (2), and another part of the electrode layer (3) is tightly attached to the high-temperature-resistant ceramic layer (4).

Figure 1:
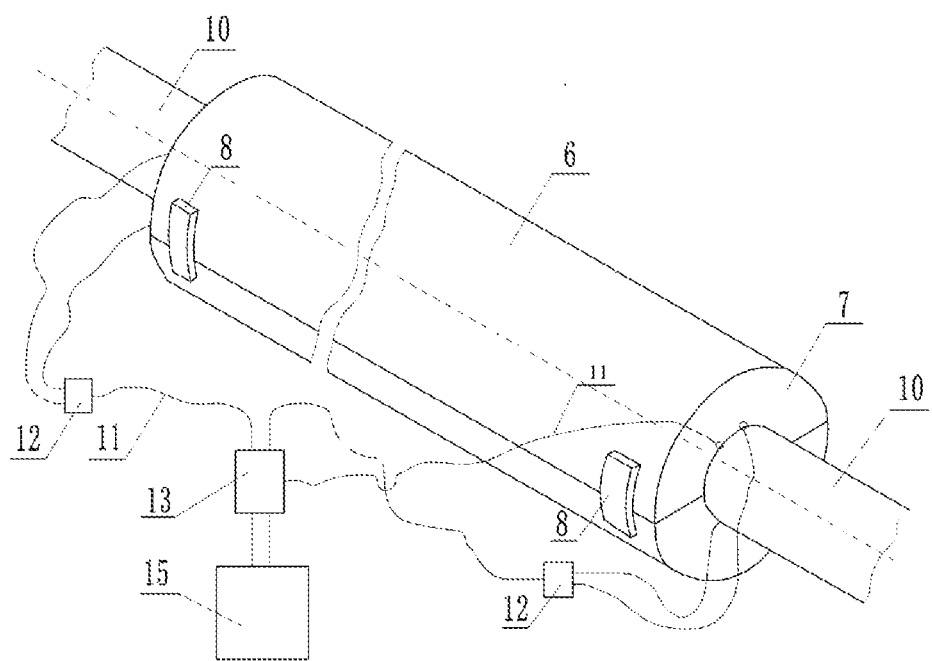
FIG. 1 is a general schematic diagram of an embodiment of the present disclosure.

FIG. 1 shows a relative position of a sealing cover (7) on the graphene-heating and heat-preserving sleeve for the oilfield petroleum gathering pipeline.

FIG. 3 shows two-part structure of a sealing clamping groove (9).

When the electrode layers (3) arranged at the two ends of the graphene layer (2) are electrically connected to the power supply (15), under the action of an electric field, heat energy is continuously generated due to intense friction and collision between carbon atoms in the graphene layer (2) and is uniformly radiated out in a plane manner through far infrared rays with a wavelength of 5 to 14 microns, which directly transfers heat to the outer surface of the oilfield petroleum gathering pipeline (10), so that the temperature of the oilfield petroleum gathering pipeline (10) rises continuously from outside to inside. The heat preservation effect achieved by the waterproof and anti-static heat preservation layer (5) and the housing (6) wrapping outside the high-temperature-resistant ceramic layer (4) can reduce the heat lost due to heat dissipation to the outside. The temperature of the outer surface of the oilfield petroleum gathering pipeline (10) is continuously transferred to the explosion-proof temperature controller (13) by the temperature sensing probe (14). When the temperature of the outer surface of the oilfield petroleum gathering pipeline (10) reaches a preset temperature range of the explosion-proof temperature controller (13), the explosion-proof temperature controller (13) automatically electrically disconnects the electrode layers (3) from the power supply (15). At this time, the graphene layer (2) stops radiating the far infrared rays. The temperature of the outer surface of the oilfield petroleum gathering pipeline (10) starts to drop. When the explosion-proof temperature controller (13) detects that the temperature of the outer surface of the oilfield petroleum gathering pipeline (10) is below the preset temperature range of the explosion-proof temperature controller (13) through the temperature sensing probe (14), the explosion-proof temperature controller (13) automatically electrically connects the electrode layers (3) to the power supply (15). The graphene layer (2) starts to radiate the far infrared rays to heat the oilfield petroleum gathering pipeline (10) under the action of the electric field. The above described process runs in cycle and works uninterruptedly, which effectively meets the requirements of heating and heat preserving of the oilfield petroleum gathering pipeline, and achieves the effect of saving energy.

What is claimed is:

1. A graphene-heating and heat-preserving sleeve for an oilfield petroleum gathering pipeline, comprising:
    a high-temperature-resistant insulating layer;
    a heating layer, wherein the heating layer is a graphene layer;
    electrode layers, wherein the electrode layers are respectively arranged at both ends of the graphene layer to form one single layer;
    a high temperature-resistant ceramic layer;
    a waterproof and anti-static heat preservation layer; and a housing; wherein the high-temperature-resistant insulating layer, the graphene layer, the high-temperature-resistant ceramic layer, the waterproof and anti-static heat preservation layer, and the housing are sequentially sleeved together from inside to outside; wherein the waterproof and anti-static heat preservation layer and the housing wrapping outside the high-temperature-resistant ceramic layer are configured to reduce heat lost due to heat dissipation to outside;
    each of the high-temperature-resistant insulating layer, the graphene layer, the electrode layers, the high-temperature-resistant ceramic layer, the waterproof and anti- static heat preservation layer, and the housing comprises two semi-cylindrical parts; the two semi-cylindrical parts are able to be coupled together, so that the petroleum gathering pipeline is able to be wrapped in the graphene-heating and heat-preserving sleeve; each of two ends of each semi-cylindrical part is provided with a semi-circular sealing cover perpendicular to an axis of the two semi-cylindrical parts; a semi-cylindrical hole is formed in a circle center of the semi-circular sealing cover; an inner side of the semi-circular sealing cover is covered with another waterproof and anti-static heat preservation layer; longitudinal sealing clamping grooves are respectively formed in contacting surfaces, parallel to the axis of the two semi-cylindrical parts, of the two semi-cylindrical parts of the housing; and the two semi-cylindrical parts are coupled in a circumferential direction by using two or more hasps.

* * * * *